Figure 1:
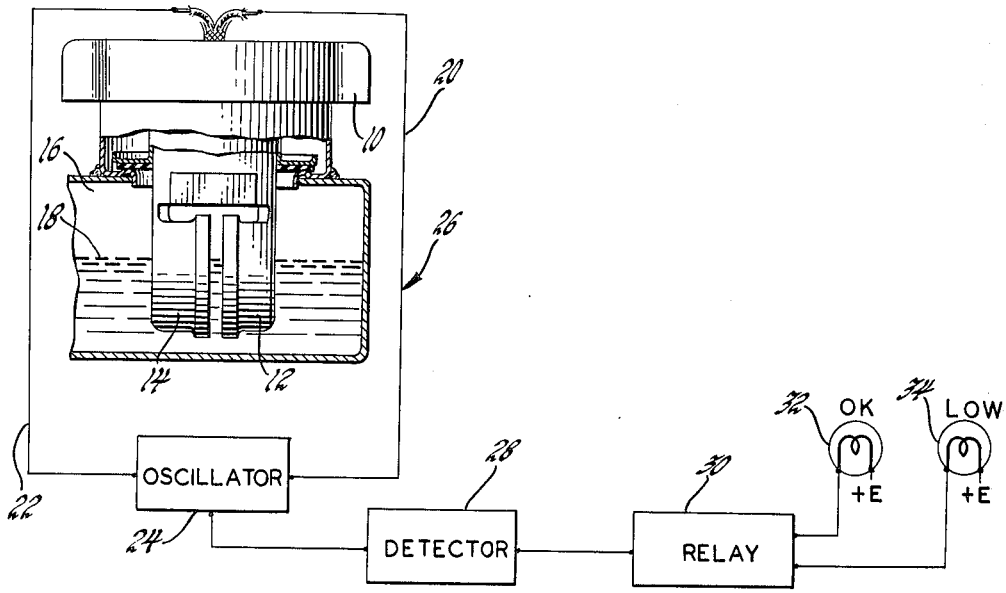

Oct. 19, 1965  J. FELICE ETAL  3,213,438

FEEDBACK CONTROLLED SONIC LIQUID DETECTOR

Filed Jan. 11, 1962

INVENTORS
Joseph Felice &
BY  Clark E. Quinn

Paul J. Ethington
ATTORNEY

United States Patent Office 3,213,438
Patented Oct. 19, 1965

3,213,438
FEEDBACK CONTROLLED SONIC LIQUID
DETECTOR
Joseph Felice, East Detroit, and Clark E. Quinn, Rochester, Mich., assignors to General Motors Corporation, Detroit, Mich., a corporation of Delaware
Filed Jan. 11, 1962, Ser. No. 165,525
2 Claims. (Cl. 340—244)

This invention relates to a circuit for detecting liquid presence and more particularly to an oscillator circuit employing a liquid contact responsive feedback circuit to control oscillator output.

It is presently known to indicate the presence or level of liquid in a container by a float-type level meter. However, it has been found to be disadvantageous to employ liquid detectors with moving parts due to the corrosive action of various liquids which eventually renders the moving parts inoperative. Additionally, the float-type level meters are generally of such a nature as to give spurious indications resulting from agitation of the liquid container.

A further disadvantage of many of the known types of liquid level meters and associated instruments is the lack of a positive indication of the liquid having reached a critical minimum level. Often this disadvantage results in an unreasonable time lag in the conveyance of vital information to an operator or attendant. In such systems which fail to give a positive indication of a critical liquid level, serious consequences may result to the expensive machinery involved if the liquid is not replenished. An example is an automobile radiator wherein critical coolant level is not indicated until a dangerous engine temperature is reached and the relatively slow acting water temperature gauge reflects the information to the operator.

A particular need for a positively indicating liquid level device is apparent in automotive machinery which is used on a round-the-clock schedule in remote areas, and regular maintenance checks on oil, gasoline, water, and other liquid levels are inconvenient and costly as they generally require returning the vehicle to a central maintenance area, thus retiring it from service for a period.

In accordance with this invention, means are provided to positively distinguish between the presence of liquid and air by an electronic device employing the generation and reception of a feedback signal between two transducers. Thus, no moving parts are involved. When properly mounted, this invention will indicate a potentially dangerous situation caused by the liquid in a container having fallen below a predetermined critical value. In general, this is accomplished through the use of an oscillator circuit employing a liquid coupled feedback circuit for controlling the output signal level of the oscillator. More specifically, the feedback circuit parameters are selected to transmit a signal of proper magnitude and phase relation for positive, or regenerative, feedback when there exists a liquid coupling between the transducers. When employed with suitable indicating means, the presence or absence of the liquid coupling will be reflected to an attendant in a positive manner.

This invention further provides means to prevent spurious indications of liquid level abberrations caused by agitation of the liquid container. This is accomplished by the inclusion of a time delay means connected in the output circuit of the oscillator precedent to the indicating device to prohibit the transmission to the indicator of an oscillator signal of less than a predetermined duration.

The invention further provides means to alter the sensitivity of the oscillator feedback circuitry to allow detection of the presence of liquids having different characteristics. These same means also lend flexibility to the scope of application of the system by allowing variations in the spacing of the sonic transducers without a corresponding change in the operating characteristics of the oscillator.

Figure 2:
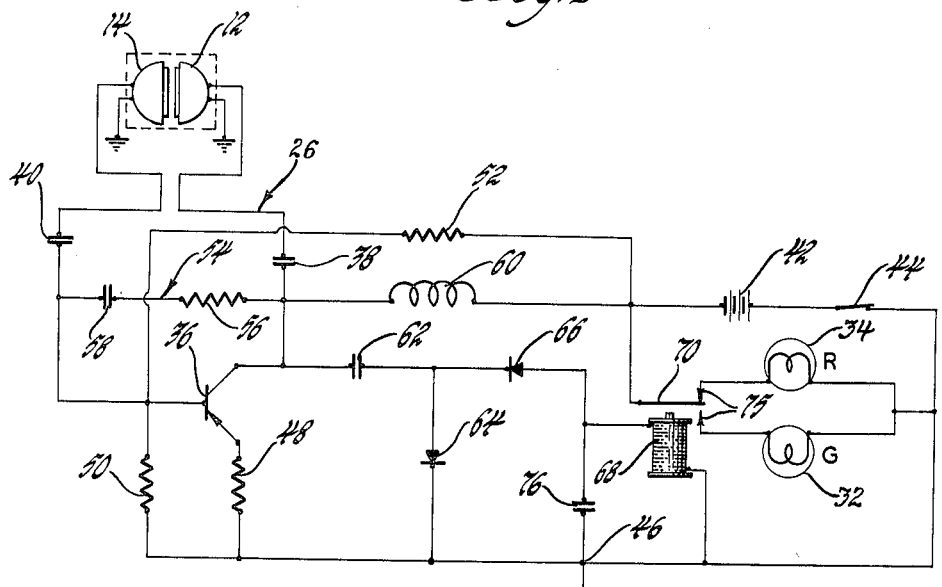

A more complete understanding of this invention may be gained by referring to the following detailed description of an illustrative embodiment of the invention as shown in the drawings of which:

FIGURE 1 is a block diagram of an application of the invention to indicate the safe level of coolant in an automobile radiator; and FIGURE 2 is a schematic diagram of a particular circuit which carries out the objectives of the invention.

Referring now to FIGURE 1, there is shown an embodiment of the invention in a system for providing an indication, to the operator of an automotive vehicle, of a deficiency in the amount of coolant present in the radiator system. While this embodiment will be discussed with particular reference to an automobile radiator, it will be clear that these same means could be employed with equal success in other areas. For instance, it may be desirable to have similar units for detecting a critical level of gasoline, brake fluid, engine or transmission oil, and windshield washer fluid.

In FIGURE 1, there is shown a radiator cap 10 having firmly secured thereto a pair of sonic transducers 12 and 14. The transducers 12 and 14 may be a conventional coil driven diaphragm type, such as that found in headphone units or hearing aids. The transducers are mounted on the radiator cap such that when the cap 10 is in place on the radiator, the transducers 12 and 14 will extend into the radiator chamber 16 a sufficient distance so as to be substantially submerged in the radiator coolant 18 when the radiator chamber 16 is properly filled. For the most efficient energy transfer, the transducers 12 and 14 are coaxially disposed so as to be facing one another and are spaced a distance apart to define an energy transmission path of a predetermined length. The transducers 12 and 14 are separately connected to a pair of electrical conductors 20 and 22, respectively, in a regenerative feedback circuit 26 which is interconnected with an oscillator circuit 24.

Regenerative feedback, more popularly known as positive feedback, is commonly employed to regulate the gain of an amplifying device such as an oscillator by transmitting a portion of the output signal back to the input or control terminal of the oscillator. The conditions necessary for efficient positive feedback to provide oscillation are that the signals transmitted to the input be in the proper phase relation with the primary input signal and also be of a sufficient magnitude as to add appreciably to the primary input signal. As the relative magnitude of the feedback signal increases, the gain, or ratio of the magnitudes of the output signal to the primary input signal, increases also. This gain can be increased to a certain level, which can be established by known criteria, after which the stability of the oscillator circuit is decreased to the point that an oscillatory output is produced. Although many configurations are known, it is common to determine the operating frequency of the oscillator by a tuned feedback circuit.

The elements thus far described are arranged such that when a liquid coupling is present between the sonic transducers 12 and 14, a series circuit for the transmission of audio frequency signals will exist in the regenerative feedback circuit 26 for the oscillator circuit 24 and the oscillator circuit 24 will produce an output whose frequency is determined by the tuning of the feedback circuit 26. In the absence of a sufficient liquid coupling between the transducers 12 and 14, as provided by the coolant 18, the feedback circuit 26 completed by the conductors 20 and 22 will not be sufficiently coupled to produce an oscillatory output from the oscillator circuit 24.

Accordingly, the feedback circuit 26 is of a sufficiently controlling nature to regulate the gain of the oscillator circuit 24 and hence the level of the oscillatory output signal which is generated therein responsive to the level of coolant 18 in the radiator chamber 16. The output of the oscillator circuit 24 is connected to a detector circuit 28 whose function it is to detect the level of the output signal of the oscillator circuit 24. The output of the detector circuit 28 is then connected to a relay circuit 30 which functions to light one of the lamps 32 or 34 in accordance with the presence or absence of the liquid 18 between the transducers 12 and 14.

In the interest of conserving power and minimizing the equipment necessary, it is apparent that the safe level indicator lamp 32 may be omitted. It can be seen that this liquid level detector provides a positive and immediate signal to the operator of the vehicle without the time lag which would be present if the engine temperature gauge were relied upon to indicate the absence of radiator coolant.

The apparatus described thus far makes inventive use of the recognized principle that sonic frequency signals are more readily conducted through a liquid than through air. Thus, when the level of liquid coolant 18 in the radiator chamber 16 is above a predetermined critical level as determined by the location of the transducers 12 and 14, a sufficient liquid coupling will be provided between the transducers 12 and 14 to sustain positive, or regenerative, feedback in the oscillator circuit 24, thus causing it to produce an oscillatory output. The output of the oscillator circuit 24 is then used to control the lighting of one of the indicating lamps 32 and 34 whose respective lighted conditions will indicate to the operator of the vehicle the level of coolant within the radiator.

Referring now to FIGURE 2, the invention is shown embodied in a transistor oscillator circuit, the output of which is used to control a suitable indicator device which may be a relay. In this circuit, a pair of diaphragm type sonic transducers 12 and 14, similar to those described above, are connected in a positive feedback circuit 26 linking an osicllator comprising transistor 36. The transistor 36 is shown as a conventional junction transistor of the PNP type employing base, emitter, and collector electrodes. However, an NPN type could also be used by employing the proper biasing. The positive feedback circuit 26 extends between the collector and base electrodes of transistor 36 and also comprises capacitors 38 and 40 connected in series with the transducers 12 and 14, respectively. Capacitor 40 is of a much greater value than capacitor 38 and is used to block the transmission of a D.C. signal to the base of transistor 36 through the feedback circuit 26. A power supply and source of base to emitter bias for the transistor 36 is provided by a D.C. source 42. The positive terminal of the voltage source 42 is connected by means of an optional switch 44 to a point of reference potential 46. The emitter of the transistor 36 is also connected to the point of reference potential 46 by means of a bias resistor 48. Connecting the base of the transistor 36 and the point of reference potential 46 is a second resistor 50 which may be of the temperature compensation type to maintain a proper base-emitter bias over a wide range of ambient temperatures. The negative terminal of the voltage source 42 is connected to the base electrode of transistor 36 by means of a bias resistor 52.

A negative feedback circuit 54 is also connected between the collector and base electrodes of transistor 36. The feedback circuit 54 comprises the series combination of a resistor 56 and a capacitor 58.

Proceeding with the description of the circuit of FIGURE 2, connected between the collector of the transistor 36 and the negative terminal of the voltage source 42 is a choke or inductor coil 60. The inductor coil 60 presents a high impedance to the alternating current signal produced by the transistor 36 upon oscillation. The inductor coil 60, however, presents a low impedance path to the D.C. bias level provided by the voltage source 42 on the collector electrode of the transistor 36.

The output circuit of the transistor 36 comprises a coupling capacitor 62, connected to the collector electrode, and a pair of current rectifying diodes 64 and 66 of wihch diode 64 has its emitter terminal connected to the point of reference potential 46. The function of the output circuit elements 62, 64 and 66 is to rectify and smooth the A.C. output of the transistor 36 and to provide a D.C. signal suitable for the energization of a relay coil 68. The electromagnetic action of the relay coil 68 is then used in actuating a switch 70 which controls the energization of a pair of parallel connected indicator lamps 32 and 34 by means of the pair of point contacts 75. Each of the lamps 32 and 34 is connected on one side to a respective contact 75, and on the other side to the positive terminal of the voltage source 42. The switch 70 is arranged such that in the absence of current of a predetermined magnitude through the relay coil 68, the lamp 34 will be connected across the D.C. source 42. Connected in shunt relation to the relay coil 68 is a capacitor 76 which is effective to delay energization of the relay coil 68 for a short period of time following the initiation of an oscillatory output from the transistor 36. It can be seen that energization of the relay coil 68 will be delayed by a time sufficient to charge the capacitor 76. The purpose of this delay is to present a false indication from one of the lamps 32 or 34 arising from splashing of the liquid between the transducers 12 and 14.

Employing the known principle that collector to base feedback signals of the proper magnitude and phase can be used to control the magnitude of the oscillatory output of a transistor oscillator, the feedback circuit 26 is provided between the collector and base electrode of the transistor 36. The feedback circuit 26 includes the sonic tranducers 12 and 14. The natural electromechanically resonant frequency of the transducers is variable with the density of the medium in effective contact with the active faces of the transducer. For example, the transducers will have an electromechanically resonant ferquency of 1200 cycles per second when in contact with water and 1800 cycles per second when in contact with air, the lower frequency in water being due to viscous damping. The inductor coil associated with the diaphragm type transducer is not shown in the drawings since transducers of this type are commercially available as a unit. However, it is apparent that each transducer appears as an inductive element in the feedback circuit 26.

The series combination of the capacitor 38 and the transducer 12 is seen to be a tunable series L–C circuit having a particular electrically resonant frequency of operation at which frequency the impedance of the circuit is a minimum. The capacitor 38 is selected such that this electrically resonant frequency is equal to the electromechanically resonant frequency of the transducers 12 and 14 which prevails when they are in contact with a liquid such as water. Accordingly, when the transducer 12 is in contact with air, the series L–C circuit provided by the transducer 12 and the capacitor 38 will present a high impedance to the signal being transmitted by the feedback path 26. The capacitor 38 is further selected such that the phase shift imparted to the feedback signal thereby will add to that imparted by the coupling between the transducers 12 and 14 such that the output signal from the collector electrode of transistor 36 will be in the proper phase relation with the signal supplied to the base of transistor 36 via the feedback circuit 26 to provide positive feedback to the transistor 36. Thus, it can be seen that in the presence of liquid sufficient to provide a signal coupling between the transducers 12 and 14, a feedback signal of the proper magnitude and phase for regeneration in the transistor 36 will be afforded by the circuit 26.

It should be noted that the capacitor 40 is of a much greater value than capacitor 38 and hence does not contribute significantly to the phase shift of the feedback signal at the present frequency of operation.

The negative feedback circuit 54 is provided between the collector and base electrodes of transistor 36 by means of resistor 56 and capacitor 58 which are connected in series. The series circuit elements 56 and 58 provide a signal to the base of transistor 36 which is shifted in phase from the signal on the collector by a proper amount to provide negative, or degenerative, feedback to the oscillator transistor 36. It can further be seen that the negative feedback provided by the feedback circuit 54 will work against the action of the feedback circuit 26; that is, the negative feedback signal will tend to inhibit an oscillatory output from the transistor 36 while the positive feedback signal will tend to encourage an oscillatory output. However, the elements which comprise the respective feedback circuits 26 and 54 are selected such that the positive feedback signal afforded by the feedback circuit 26, when there is a substantial liquid coupling between the two transducers 12 and 14, will overbalance the negative feedback signal provided by feedback circuit 54 and the transistor oscillator 36 will produce an oscillatory output of a predetermined magnitude.

Considering the operation of the circuit of FIGURE 2 in greater detail, the following factors should be kept in mind. The coupling of sonic energy is more efficient in a liquid than in air. Furthermore, the electromechanically resonant frequency of the transducers 12 and 14 is lower when they are in a liquid than when they are in air. Also, as previously mentioned, that portion of the positive feedback circuit 26 as defined by the transducer 12 connected in series with the capacitor 38 is tuned to electrical resonance at the frequency of electromechanical resonance of the transducers 12 and 14 when they are in contact with liquid to utilize the electromechanical gain obtained in such operations. Further, the time of energy transit over the transmission path between the transducers is greater in air than in liquid. The capacitor 38 is selected to add sufficient feedback signal phase shift to that phase shift sustained in transit between the transducers 12 and 14 so as to create conditions for regeneration when the transducers are submerged in a liquid. Thus, the magnitude and phase of the feedback signal transmitted by the circuit 26 are effectively controlled by the presence of liquid or air in the space between the transducers 12 and 14. When the transducers are removed from the liquid, oscillation of the transistor 36 will decrease or stop because of the factors outlined above. That is, the magnitude of the feedback signal in circuit 26 will decrease, first due to the lower coefficient of coupling between transducers 12 and 14. Secondly, the fact that the transducer 12 is in contact with air will dictate a feedback signal frequency which does not correspond to the resonant frequency of the L–C circuit comprising transducer 12 and capacitor 38. Accordingly, a high impedance to the feedback signal is presented by the L–C circuit. Additionally, the transit time for the feedback signal over the transmission path between the transducers is increased and, thus, the proper phase relation for regenerative feedback no longer exists.

As was previously mentioned, the distance between the transducers 12 and 14 is significant in obtaining the proper phase shift in the feedback signal transmitted by circuit 26 when the transducers 12 and 14 are submerged in a liquid. It is foreseeable that under certain circumstances it may be necessary to place the transducers 12 and 14 closer together than under other circumstances. It has been found that when the transducers 12 and 14 are separated by less than a predetermined distance, it is possible that a coupling between transducers 12 and 14 will be provided which is adequate to sustain oscillation in the transistor 36 even when the transducers 12 and 14 are in air. Therefore, to add flexibility to the scope of application of this device, it has been found desirable to include the negative feedback circuit 54. The circuit 54 supplies sufficient negative feedback to inhibit the oscillatory action of the transistor 36 during those periods in which the efficiency of the coupling between transducers 12 and 14 is below a predetermined critical value. By this process of balancing negative feedback against positive feedback, it is possible to obtain advantageous latitude in the requirements placed upon the spacing of transducers 12 and 14. The choice of a sonic or audio frequency signal also contributes to the latitude in the spacing between transducers 12 and 14; in that, the wave length of the audio frequency signal is much greater than the distance between the transducer faces.

To summarize the aforementioned considerations, the presence of liquid between these transducers 12 and 14 will provide a coupling therebetween which, when considered in series with the capacitors 38 and 40, will provide a regenerative feedback signal to the base of transistor 36. This regeneration signal will be of a sufficient magnitude and phase relation to more than compensate for the negative feedback signal provided by path 54 and, thus, sustain oscillations of a predetermined amplitude in the transistor 36. When the liquid between the transducers 12 and 14 falls below a predetermined critical level which may, for example, be approximately that level shown in FIGURE 1, the magnitude of the positive feedback signal will be accordingly reduced. Additionally, the phase relation of the collector to base feedback signal provided by circuit 26 will be improper for regenerative feedback. Therefore, the negative feedback signal provided by circuit 54 will become dominant and the oscillatory output of transistor 36 will be significantly reduced or eliminated.

The presence or absence of a rectified signal from the output of transistor 36 will accordingly control the energization of the relay coil 68, the position of the switch 70, and the lighted or unlighted state of the indicator lamps 32 and 34. With a liquid coupling provided between the transducers 12 and 14, the transistor 36 will produce an oscillatory output sufficient to energize the relay 68 which moves the switch 70 to the lower point contact 75 as shown in the drawing, and causes the lamp 32 to be lighted by the voltage source 38. The lamp 32 may appropriately be a green color for indicating a satisfactory condition in the liquid reservoir. In the event the liquid coupling is not provided between the transducers 12 and 14, the relay coil 68 will be de-energized and the indicator lamp 34 will be connected across the voltage source 38 by means of the switch 70. The indicator lamp 34 may appropriately be of a red color to indicate a danger situation in the liquid reservoir.

It will be obvious that one or the other of the indicator lamps 32 and 34 may be eliminated without a loss of information. However, since the absence of a signal would be more likely to go unnoticed longer than the presence of a signal, it is felt advisable to eliminate the green indicator lamp 32 rather than the red indicator lamp 34. In this event, an absence of a liquid coupling between the transducers 12 and 14 would result in de-energization of the coil 68 and movement of the switch 70 to light the danger signal lamp 34.

It is contemplated that the various modifications and alterations may be made to the illustrative examples shown and described herein without departing from the spirit and scope of the invention. For a definition of the invention reference should be had to the appended claims.

We claim:

1. Apparatus for distinguishing between the presence of liquid and air including a feedback controlled oscillator circuit having an input and an output, a power supply operatively interconnected with the oscillator circuit, a positive feedback circuit connecting the output and input of the oscillator circuit and effective to transmit a feedback signal therebetween, the positive feedback circuit including first and second sonic transducers spaced a predetermined distance apart in a volume normally occupied by liquid and mutually coupled in energy transfer relation through a predetermined transmission path, the first and second transducers having a first electromechanically resonant frequency when the transducers are in contact with a liquid and a second electromechanically resonant frequency when they are in contact with air, reactive means connected in circuit with the first transducer for tuning the combination of the reactive means and the first transducer to electrical resonance at a frequency equal to the first electromechanically resonant frequency, whereby the feedback signal is of a first magnitude when the transducers are in contact with liquid and a second magnitude when the transducers are in contact with air, the reactive means being effective to shift the feedback signal in phase by a first amount, the predetermined transmission path being effective to shift the feedback signal in phase by second and third amounts corresponding to the presence of liquid and air, respectively, in the transmission path, the feedback signal being effective to produce an oscillatory output of a first amplitude from the oscillator circuit when the feedback signal is of the first magnitude and is shifted in phase by the sum of the first and second amounts, and a second amplitude when the feedback signal is of the second magnitude and is shifted in phase by the sum of the first and third amounts, and indicator means connected to the output of the oscillator circuit and adapted to indicate whether the oscillatory output is of the first or second amplitudes.

2. Apparatus as defined in claim 1 including time delay means connected to the indicator means and effective to delay a change in indication due to a change in the amplitude of the oscillatory output from the second amplitude to the first amplitude.

References Cited by the Examiner
UNITED STATES PATENTS

| | | | |
|---|---|---|---|
| 2,277,037 | 3/42 | Clark et al. | 73—67.6 |
| 2,817,806 | 12/57 | Borell | 317—142 XR |
| 2,847,625 | 8/58 | Popowsky | 331—65 XR |
| 2,891,159 | 6/59 | Politi et al. | 331—65 XR |

FOREIGN PATENTS

| | | |
|---|---|---|
| 612,545 | 1/61 | Canada. |
| 813,497 | 5/59 | Great Britain. |
| 839,092 | 6/60 | Great Britain. |

NEIL C. READ, *Primary Examiner*.